(12) United States Patent
Kim et al.

(10) Patent No.: US 11,142,193 B2
(45) Date of Patent: Oct. 12, 2021

(54) VEHICLE AND METHOD FOR PERFORMING INTER-VEHICLE DISTANCE CONTROL

(71) Applicants: Hyundai Motor Company, Seoul (KR); Kia Motors Corporation, Seoul (KR)

(72) Inventors: Seunghyun Kim, Seoul (KR); Hong Gi Park, Seoul (KR); Ilhwan Kim, Hwaseong-si (KR); Donghyuk Kim, Hwaseong-si (KR); Kyung-joo Bang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 244 days.

(21) Appl. No.: 16/663,204

(22) Filed: Oct. 24, 2019

(65) Prior Publication Data
US 2021/0009113 A1   Jan. 14, 2021

(30) Foreign Application Priority Data
Jul. 8, 2019 (KR) .................. 10-2019-0082047

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0956; B60W 30/162;
(Continued)

(56) References Cited

U.S. PATENT DOCUMENTS 5,633,705 A * 5/1997 Asayama ................ G01S 17/08
356/3.14
7,259,660 B2 * 8/2007 Ewerhart ................ B60Q 9/00
340/436

(Continued)

FOREIGN PATENT DOCUMENTS

KR    10-1728323 B1    5/2017

*Primary Examiner* — Jason Holloway
(74) *Attorney, Agent, or Firm* — Morgan, Lewis & Bockius LLP

(57) ABSTRACT

A vehicle includes: a capturer configured to obtain height information of a preceding vehicle; a sensor configured to obtain at least one of position information or speed information of the preceding vehicle and a leading vehicle; and a controller configured to determine a first distance between the preceding vehicle and a subject vehicle, to determine a second distance between the preceding vehicle and the leading vehicle, to determine an acceleration of the preceding vehicle based on a relative speed and a relative distance of the preceding vehicle and the leading vehicle, and to control at least one of braking or steering of the subject vehicle when the second distance is less than or equal to a collision prediction distance between the preceding vehicle and the leading vehicle and the acceleration of the preceding vehicle is less than a predetermined value.

14 Claims, 6 Drawing Sheets

(51) Int. Cl.
  *B60W 10/20*  (2006.01)
  *B60W 30/095*  (2012.01)
  *B60W 30/16*  (2020.01)

(52) U.S. Cl.
  CPC ...... *B60W 30/0956* (2013.01); *B60W 30/162* (2013.01); *B60W 2554/801* (2020.02); *B60W 2554/804* (2020.02); *B60W 2710/18* (2013.01); *B60W 2710/20* (2013.01); *B60W 2720/106* (2013.01); *B60W 2754/30* (2020.02)

(58) Field of Classification Search
  CPC ..... B60W 2554/801; B60W 2554/804; B60W 2754/30; B60W 2710/18; B60W 2710/20; B60W 2720/106; B60W 30/18163; B60W 30/16; B60W 30/0953; B60W 2554/802; B60W 40/105; B60W 2520/10; B60W 2720/10; B60W 2554/00; B60W 2554/80; B60R 21/0134; B60Y 2300/09; B60Y 2300/16; B60Y 2300/18166
  See application file for complete search history.

(56) References Cited

U.S. PATENT DOCUMENTS

| | | | |
|---|---|---|---|
| 9,751,528 B2* | 9/2017 | Uechi | G01S 13/87 |
| 10,151,840 B2* | 12/2018 | Itoh | G01S 7/4808 |
| 10,331,961 B2* | 6/2019 | Lin | G06K 9/6202 |
| 2013/0229522 A1* | 9/2013 | Schofield | B60K 35/00 |
| | | | 348/148 |
| 2016/0207533 A1* | 7/2016 | Uechi | G08G 1/166 |

\* cited by examiner

VEHICLE AND METHOD FOR PERFORMING INTER-VEHICLE DISTANCE CONTROL

CROSS-REFERENCE TO RELATED APPLICATION(S)

This application is based on and claims priority to Korean Patent Application No. 10-2019-0082047, filed on Jul. 8, 2019 in the Korean Intellectual Property Office, the disclosure of which is incorporated by reference in its entirety.

TECHNICAL FIELD

The present disclosure relates to a vehicle and a method of controlling the vehicle, and more particularly, to a technology corresponding to a sudden stop of a preceding vehicle by analyzing a behavior of a vehicle driving in front of the preceding vehicle.

BACKGROUND

Generally, vehicles are driven on the road or tracks to transport people or goods to destinations. Vehicles are able to move to various locations with one or more wheels mounted onto the frame of the vehicle. Such vehicles may be classified into three- or four-wheel vehicles, a two-wheel vehicle such as a motorcycle, construction machinery, bicycles, trains traveling along rails on tracks, and the like.

In modern society, vehicles are the most common transportation means, and the use thereof has been increasing. With the development of automotive technology, there are advantages of being able to travel long distances. However, traffic jams have been increased particularly where population densities are relatively high.

To relieve burdens and increase convenience of a driver, recent studies regarding vehicles equipped with an Advanced Driver Assist System (ADAS), which can provide information regarding a state of the vehicle, a driver's state, and surrounding conditions, have been actively ongoing.

Examples of the ADAS equipped within the vehicle include smart cruise control system, Lane Keeping Assist System (LKAS), Lane Keeping Assist (LKA) and Lane Departure Warning (LDW) System, Forward Collision Avoidance (FCA), Autonomous Emergency Brake (AEB), etc. The above systems help avoid collision through emergency braking by determining a risk of collision with an opposing vehicle or a crossover vehicle while the vehicle is being driven, controlling the vehicle to drive while maintaining a distance from a preceding vehicle, and/or assisting the vehicle not to deviate from a driving lane.

The smart cruise control system generally performs Smart Cruise Control (SCC) using only preceding vehicle information on a driving route of the vehicle. However, when performing the SCC, the smart cruise control system can predict and respond in advance to a sudden stop of the preceding vehicle by analyzing a behavior of a vehicle driving in front of the preceding vehicle (hereinafter, referred to as "leading vehicle") when leading vehicle information is used in addition to the preceding vehicle information.

Recently, the importance of a technology for performing inter-vehicle distance control to increase the reliability of the leading vehicle information by using a high height of a large truck, and for performing braking control or steering avoidance control for the preceding vehicle based on the leading vehicle information is increasing.

SUMMARY

An aspect of the disclosure is to provide a vehicle for performing inter-vehicle distance control to increase the reliability of leading vehicle information and performing braking control or steering avoidance control for a preceding vehicle based on the leading vehicle information, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle includes: a capturer configured to obtain height information of a preceding vehicle; a sensor configured to obtain at least one of position information or speed information of the preceding vehicle and a leading vehicle that is in front of the preceding vehicle; and a controller configured to determine a first distance between the preceding vehicle and a subject vehicle that is behind the preceding vehicle, to determine a second distance between the preceding vehicle and the leading vehicle based on height information of the subject vehicle, the first distance, the height information of the preceding vehicle, to determine an acceleration of the preceding vehicle based on a relative speed and a relative distance of the preceding vehicle and the leading vehicle, and to control at least one of braking or steering of the subject vehicle when the second distance is less than or equal to a collision prediction distance between the preceding vehicle and the leading vehicle and the acceleration of the preceding vehicle is less than a predetermined value.

The controller may determine the collision prediction distance between the preceding vehicle and the leading vehicle based on a driving speed of the preceding vehicle and a time to collision (TTC) between the preceding vehicle and the leading vehicle.

The vehicle may further include a speed regulator configured to regulate a driving speed of the subject vehicle. When the second distance is greater than the collision prediction distance between the preceding vehicle and the leading vehicle, the controller may control the speed regulator such that the subject vehicle drives toward the preceding vehicle to decrease the first distance. The second distance decreases in response to a decrease in the first distance.

When the second distance is less than or equal to the collision prediction distance between the preceding vehicle and the leading vehicle and the acceleration of the preceding vehicle is less than the predetermined value, the controller may control braking of the subject vehicle when the first distance is greater than a braking possible distance of the subject vehicle relative to the preceding vehicle.

The sensor may obtain at least one of position information or speed information of an obstacle located in a lane next to a lane in which the subject vehicle is driving. When the second distance is less than or equal to the collision prediction distance between the preceding vehicle and the leading vehicle and the acceleration of the preceding vehicle is less than the predetermined value, the controller may determine whether the subject vehicle is lane changeable based on an obstacle detection result of the sensor when the first distance is less than or equal to the braking possible distance of the subject vehicle relative to the preceding vehicle. When the subject vehicle is lane changeable, the controller may control steering avoidance of the subject vehicle with respect to the preceding vehicle.

When the second distance is less than or equal to the collision prediction distance between the preceding vehicle and the leading vehicle and the acceleration of the preceding vehicle is less than the predetermined value, the controller may control the braking of the subject vehicle with a maximum braking amount when the first distance is less than or equal to the braking possible distance of the subject vehicle relative to the preceding vehicle and the subject vehicle cannot change the lane according to the obstacle detection result of the sensor.

When the second distance is greater than the collision prediction distance between the preceding vehicle and the leading vehicle and the acceleration of the preceding vehicle is less than the predetermined value, the controller may control the speed regulator to increase the first distance.

In accordance with another aspect of the disclosure, a method of controlling a vehicle includes: obtaining, by a capturer, height information of a preceding vehicle; obtaining, by a sensor, at least one of position information or speed information of the preceding vehicle and a leading vehicle that is in front of the preceding vehicle; determining, by a controller, a first distance between the preceding vehicle and a subject vehicle that is behind the preceding vehicle; determining, by the controller, a second distance between the preceding vehicle and the leading vehicle based on height information of the subject vehicle, the first distance, and the height information of the preceding vehicle; determining, by the controller, an acceleration of the preceding vehicle based on a relative speed and a relative distance of the preceding vehicle and the leading vehicle; and when the second distance is less than or equal to a collision prediction distance between the preceding vehicle and the leading vehicle and the acceleration of the preceding vehicle is less than a predetermined value, controlling, by the controller, at least one of braking or steering of the subject vehicle.

The determining of the collision prediction distance between the preceding vehicle and the leading vehicle may include determining the collision prediction distance between the preceding vehicle and the leading vehicle based on a driving speed of the preceding vehicle and a time to collision (TTC) between the preceding vehicle and the leading vehicle.

The method may further include regulating, by a speed regulator, a driving speed of the subject vehicle. The controlling of the at least one of braking or steering of the subject vehicle may include controlling the driving speed of the subject vehicle such that the subject vehicle drives toward the preceding vehicle to decrease the first distance when the second distance is greater than the collision prediction distance between the preceding vehicle and the leading vehicle. The second distance decreases in response to a decrease in the first distance.

When the second distance is less than or equal to the collision prediction distance between the preceding vehicle and the leading vehicle and the acceleration of the preceding vehicle is less than the predetermined value, the controlling of the at least one of braking or steering of the subject vehicle may include controlling braking of the subject vehicle when the first distance is greater than a braking possible distance of the subject vehicle relative to the preceding vehicle.

The method may further include obtaining, by the sensor, at least one of position information or speed information of an obstacle located in a lane next to a lane in which the subject vehicle is driving. When the second distance is less than or equal to the collision prediction distance between the preceding vehicle and the leading vehicle and the acceleration of the preceding vehicle is less than the predetermined value, The controlling of the at least one of braking or steering of the subject vehicle may include determining whether the subject vehicle is lane changeable based on an obstacle detection result when the first distance is less than or equal to the braking possible distance of the subject vehicle relative to the preceding vehicle; and controlling steering avoidance of the subject vehicle with respect to the preceding vehicle when the subject vehicle is lane changeable.

When the second distance is less than or equal to the collision prediction distance between the preceding vehicle and the leading vehicle and the acceleration of the preceding vehicle is less than the predetermined value, The controlling of the at least one of braking or steering of the subject vehicle may include controlling the braking of the subject vehicle with a maximum braking amount when the first distance is less than or equal to the braking possible distance of the subject vehicle relative to the preceding vehicle and the subject vehicle cannot change the lane according to the obstacle detection result.

When the second distance is greater than the collision prediction distance between the preceding vehicle and the leading vehicle and the acceleration of the preceding vehicle is less than the predetermined value, the controlling of the at least one of braking or steering of the subject vehicle may include controlling the driving speed of the subject vehicle to increase the first distance.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
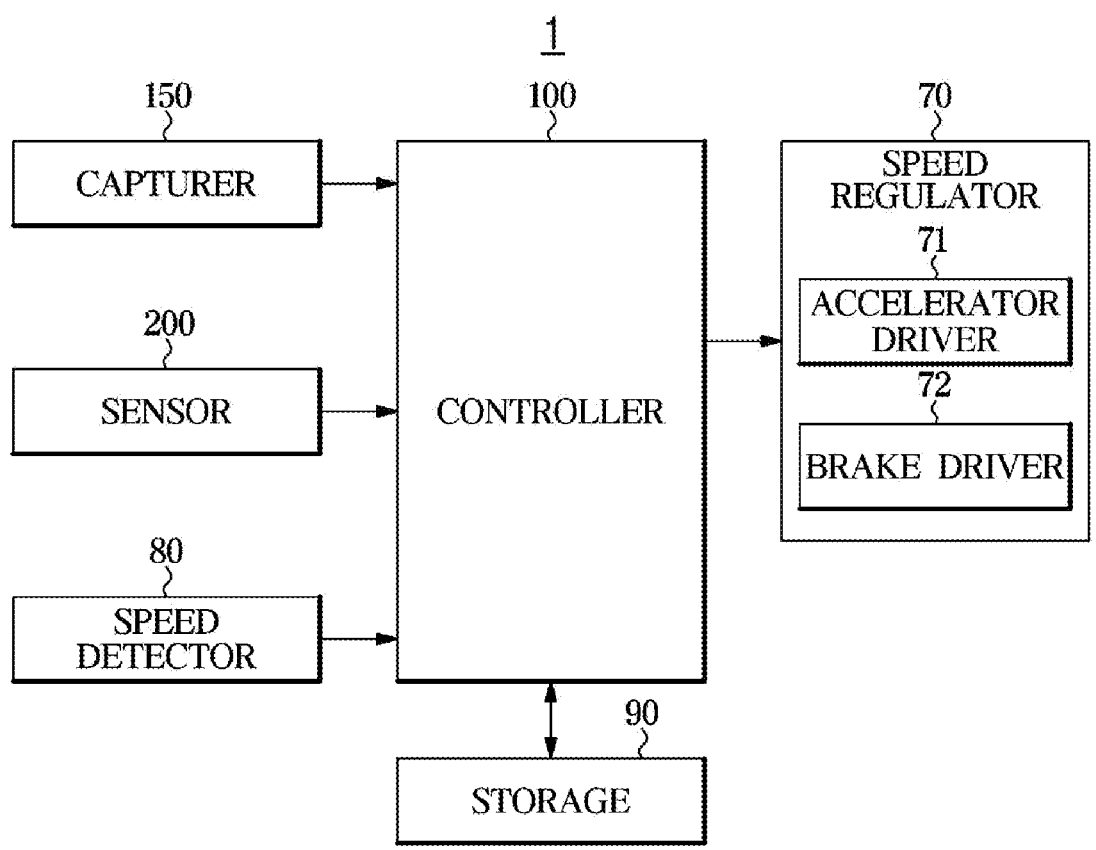
FIG. 1 is a control block diagram of a vehicle according to exemplary embodiments of the disclosure.

Like reference numerals refer to like elements throughout the specification. Not all elements of exemplary embodiments of the disclosure will be described, and description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it can be directly or indirectly connected to the other element, wherein the indirect connection includes "connection" via a wireless communication network.

When a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

The principle and exemplary embodiments of the disclosure will now be described with reference to the accompanying drawings.

Figure 2:
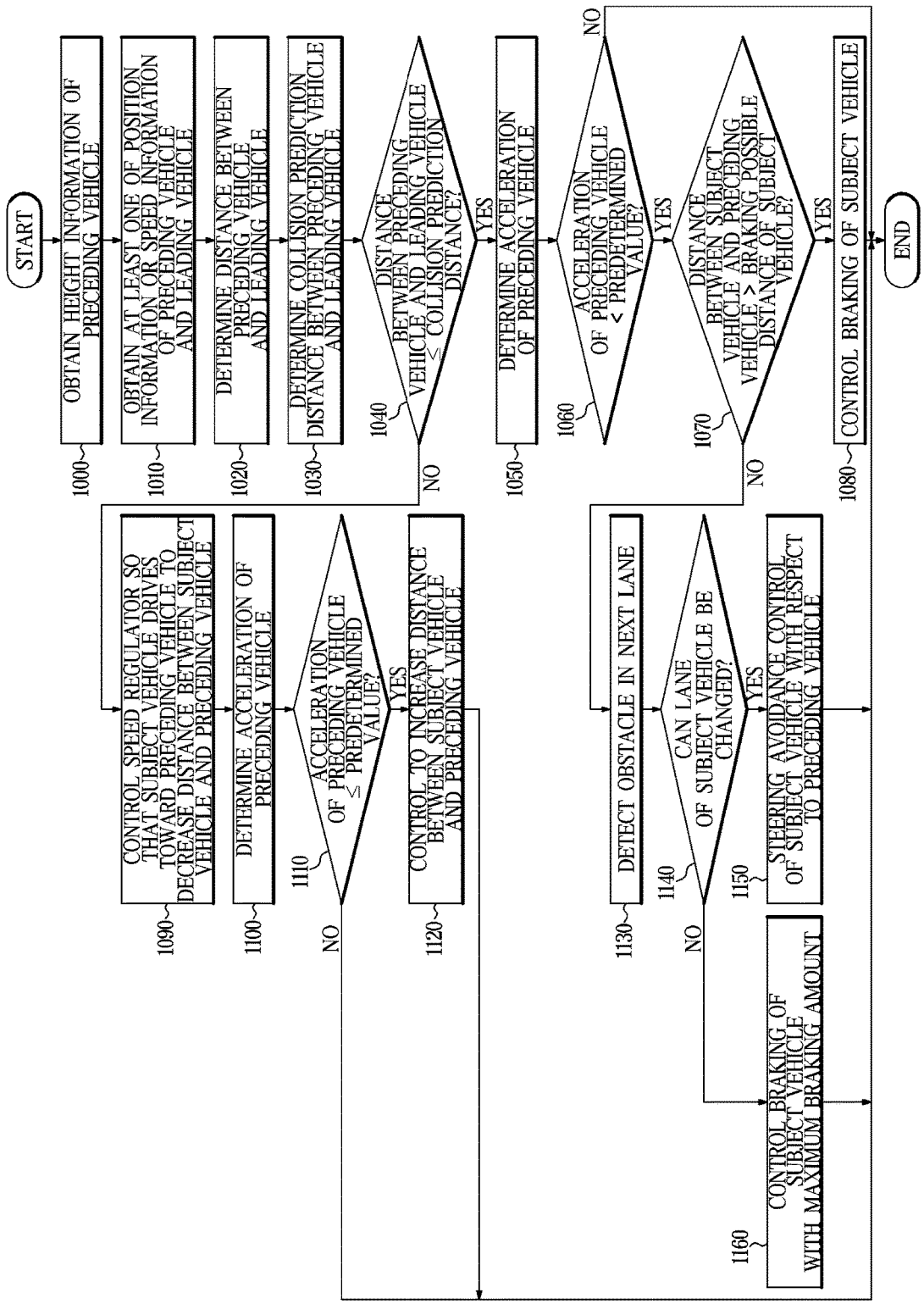
FIG. 2 is a flowchart illustrating a method of controlling a vehicle according to exemplary embodiments of the disclosure.
Figure 3:
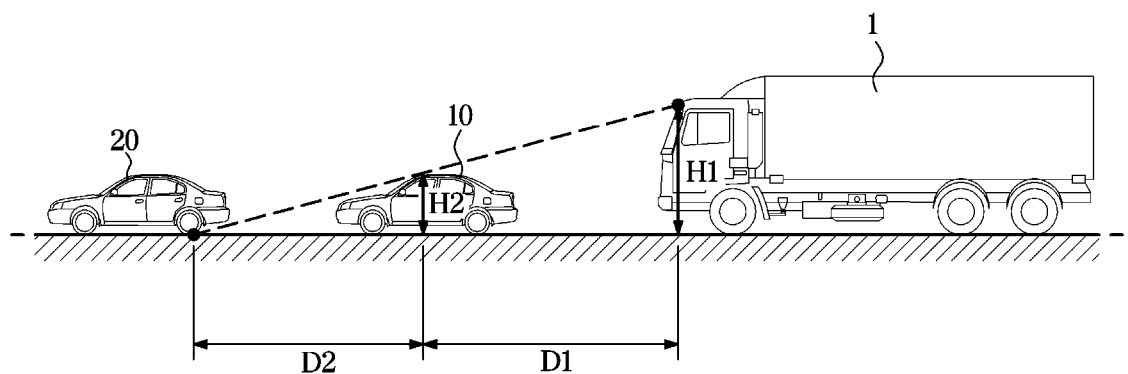
FIG. 3 is a conceptual view illustrating obtaining a recognition rate of a leading vehicle according to exemplary embodiments of the disclosure.
Figure 4:
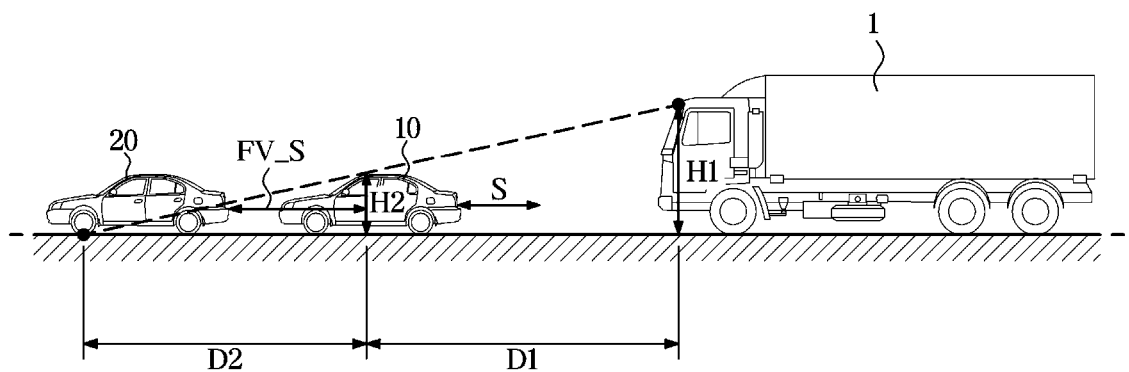
FIGS. 4 and 5 are conceptual views illustrating an inter-vehicle distance control method for improving a recognition rate of a leading vehicle according to exemplary embodiments of the disclosure.
Figure 5:
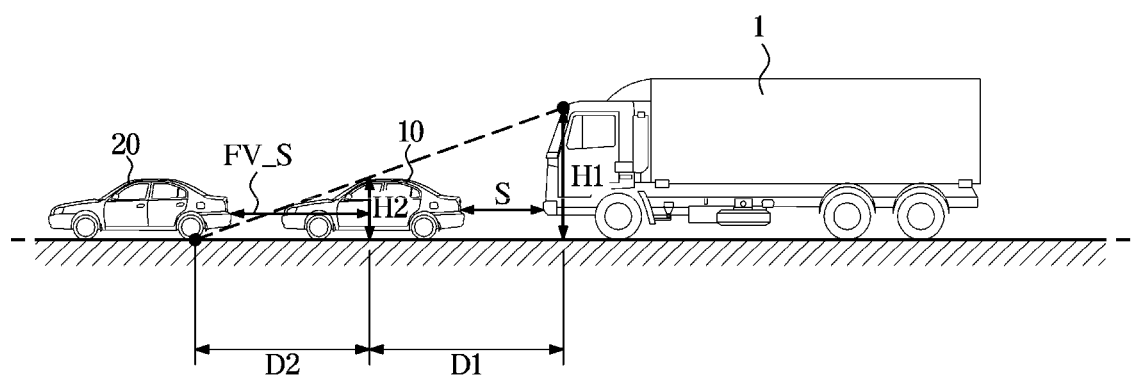
Figure 6:
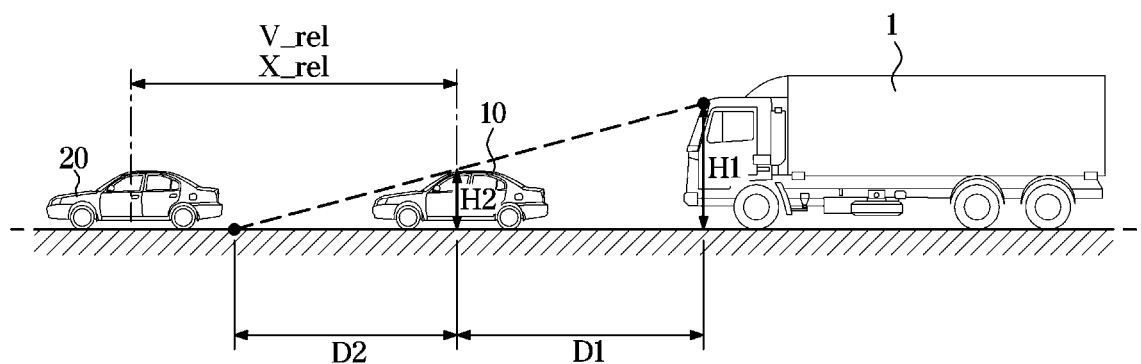
FIG. 6 is a conceptual view illustrating collision avoidance control for a preceding vehicle according to exemplary embodiments of the disclosure.

FIG. 1 is a control block diagram of a vehicle according to exemplary embodiments of the disclosure, FIG. 2 is a flowchart illustrating a method of controlling a vehicle according to exemplary embodiments of the disclosure, FIG. 3 is a conceptual view illustrating obtaining a recognition rate of a leading vehicle according to exemplary embodiments of the disclosure, FIGS. 4 and 5 are conceptual views illustrating an inter-vehicle distance control method for improving a recognition rate of a leading vehicle according to exemplary embodiments of the disclosure, and FIG. 6 is a conceptual view illustrating collision avoidance control for a preceding vehicle according to exemplary embodiments of the disclosure.

Referring to FIG. 1, a vehicle 1 may include, a speed regulator 70 for regulating a driving speed of the vehicle 1 driven by a driver, a speed detector 80 for detecting the driving speed of the vehicle 1, a storage 90 for storing data related to the operation of the vehicle 1, a controller 100 for operating each component of the vehicle 1 and controlling the driving speed of the vehicle 1, a capturer 150 for capturing around the vehicle 1, and a sensor 200 for detecting an object located around the vehicle 1.

The vehicle 1 may generally include all kinds of vehicles. However, hereinafter, a case where the vehicle 1 is a large truck will be described as an example.

In particular, the speed regulator 70 may regulate the speed of the vehicle 1 driven by the driver. The speed regulator 70 may include an accelerator driver 71 and a brake driver 72.

The accelerator driver 71 may increase the speed of the vehicle 1 by operating the accelerator in response to the control signal of the controller 100. The brake driver 72 may reduce the speed of the vehicle 1 by operating the brake in response to the control signal of the controller 100.

The speed regulator 70 may regulate the driving speed of the vehicle 1 under the control of the controller 100. When the risk of collision between the vehicle 1 and another object is high, the speed regulator 70 may decrease the driving speed of the vehicle 1.

The speed detector 80 may detect the driving speed of the vehicle 1 driven by the driver under the control of the controller 100. In other words, the speed detector 80 may detect the driving speed by using a rotation speed of the vehicle wheel, wherein the driving speed may be expressed as [kph], and a distance (km) traveled per unit time (h).

The storage 90 may store various data related to the control of the vehicle 1. Particularly, according to an exemplary embodiment, the storage 90 may store information related to the driving speed, a driving distance, and a driving time of the vehicle 1. Further, the storage 90 may store the position information and the speed information of the object detected by the sensor 200 and store coordinates information of the moving object changed in real time. The storage 90 may store information related to a relative distance and a relative speed between the vehicle 1 and the object. In addition, the storage 90 may store data related to equations and control algorithms for operating the vehicle 1, and the controller 100 may transmit a control signal for operating the vehicle 1 in accordance with the equations and control algorithm.

The storage 90 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory; a volatile memory element, e.g., a Random Access Memory (RAM); or a storage medium, e.g., a Hard Disk Drive (HDD) and a CD-ROM. The implementation of the storage is not limited thereto. The storage 90 may be a memory that is implemented by a separate memory chip from the aforementioned processor related to the controller 100 or the storage may be implemented by a single chip with a processor.

The controller 100 may be a computer, a processor such as a Central Processing Unit (CPU), an Electronic Control Unit (ECU), etc.

The capturer 150 may be a camera, video camera, or the like and may capture an image around the vehicle 1 while the vehicle 1 is being driven or stopped, and obtain information related to a type and position of the object. The object captured in the image around the vehicle 1 may include another vehicle (e.g., a surrounding vehicle), a pedestrian, a bicycle, etc., and may include a moving object or various stationary obstacles.

The capturer 150 may detect the type of the object around the vehicle 1 by capturing an image of the object and identifying a shape of the captured object through image recognition, and may be configured to transmit the detected information to the controller 100.

The capturer 150 may obtain height information of another vehicle by capturing another vehicle driving in front of the vehicle 1. In other words, as illustrated in FIG. 3, the capturer 150 of the vehicle 1 may obtain the height information by capturing a preceding vehicle 10 driving in front of the vehicle 1.

The capturer 150 may be provided at a predetermined position of the vehicle 1, and there is no limitation on an installation position or the number of installations.

The sensor 200 may obtain at least one of position information and driving speed information of the object located around of the vehicle 1. In other words, the sensor 200 may obtain coordinate information, which changes as the object moves, in real time, and detect a distance between the vehicle 1 and the object.

The controller 100 may calculate the relative distance and the relative speed between the vehicle 1 (e.g., subject vehicle) and the object based on the position and speed information of the object obtained by the sensor 200, and thus, the controller 100 may calculate a time to collision (TTC) between the vehicle 1 and the object based on the calculated relative distance and relative speed.

The sensor 200 may be installed in a position that is appropriate to detect the object, e.g., other vehicle, in the front, lateral or front lateral side of the vehicle 1. According to an exemplary embodiment, the sensor 200 may be installed at the front, the left and the right side of the vehicle 1 to detect the object in the front side of the vehicle 1, a direction between the left side and the front side (hereinafter, referred to as "front left side") of the vehicle 1 and a direction between the right side and the front side (hereinafter, referred to as "front right side") of the vehicle 1.

As illustrated in FIG. 3, the sensor 200 may obtain at least one of the position information or the speed information of the preceding vehicle 10 and a leading vehicle 20.

The sensor 200 may be implemented using a variety of devices, e.g., a radar using millimeter waves or microwaves, Light Detection And Ranging (LiDAR) using pulsed laser light, a vision sensor using visible light, an infrared sensor using infrared light, or an ultrasonic sensor using ultrasonic waves. The sensor 200 may be implemented using any one of the radar, the Light Detection And Ranging (LiDAR), the vision sensor, the infrared sensor, or the ultrasonic sensor or by combining them. When a plurality of the sensors 200 is disposed within the vehicle 1, each of the sensors 200 may be implemented by using the same type of sensor or different type of sensor. The implementation of the sensor 200 is not limited thereto, and the sensor 200 may be implemented using a variety of devices and a combination thereof which is considered by a designer.

Referring to FIG. 2, while the vehicle 1 (hereinafter, referred to as "subject vehicle") is driving, the capturer 150 may obtain height information H2 of the preceding vehicle 10 by capturing the preceding vehicle 10 driving in front of the subject vehicle 1 (1000).

In addition, the sensor 200 may obtain at least one of the position information or the speed information of the preceding vehicle 10 and the leading vehicle 20 driving in front of the preceding vehicle 10 (1010).

The controller 100 may determine a second distance D2 between the preceding vehicle 10 and the leading vehicle 20 based on height information H1 of the subject vehicle 1, a first distance D1 between the subject vehicle 1 and the preceding vehicle 10, and the height information H2 of the preceding vehicle 10 (1020).

In other words, as illustrated in FIG. 3, the controller 100 may calculate the second distance D2 between the preceding vehicle 10 and the leading vehicle 20 based on Equation 1 below.

$$D2 = (D1 * H2)/(H1 - H2) \quad \text{[Equation 1]}$$

The second distance D2 calculated by the controller 100 may be a longitudinal distance of a blind spot due to the height H1 of the preceding vehicle 10 when the subject vehicle 1 recognizes the leading vehicle 20. As a value of the second distance D2 is smaller, a recognition rate of the leading vehicle 20 of the subject vehicle 1 may increase.

Based on Equation 1 described above, since the value of the second distance D2 decreases as the height H1 of the subject vehicle 1 increases, the recognition rate of the leading vehicle 20 of the subject vehicle 1 may increase.

In addition, since the value of the second distance D2 decreases as the height H2 of the preceding vehicle 10 decreases, the recognition rate of the leading vehicle 20 of the subject vehicle 1 may increase.

Further, since the value of the second distance D2 decreases as the distance D1 between the subject vehicle 1 and the preceding vehicle 10 is shorter, the recognition rate of the leading vehicle 20 of the subject vehicle 1 may increase.

The controller 100 may determine a collision prediction distance FV_S between the preceding vehicle 10 and the leading vehicle 20 based on the driving speed of the preceding vehicle 10 and the TTC between the preceding vehicle 10 and the leading vehicle 20 (1030). In other words, the collision prediction distance FV_S may be a minimum safety distance for preventing the preceding vehicle 10 and the leading vehicle 20 from colliding with each other.

The controller 100 may compare the second distance D2 between the preceding vehicle 10 and the leading vehicle 20 and the collision prediction distance FV_S between the preceding vehicle 10 and the leading vehicle 20 (1040).

As a result of comparison, when the second distance D2 is less than or equal to the collision prediction distance FV_S, the controller 100 may determine that the recognition reliability for performing collision avoidance control on the preceding vehicle 10 is secured by the subject vehicle 1 recognizing the leading vehicle 20.

On the other hand, as the result of the comparison, when the second distance D2 is greater than the collision prediction distance FV_S, the controller 100 may determine that the recognition reliability for performing collision avoidance control on the preceding vehicle 10 is not secured by the subject vehicle 1 recognizing the leading vehicle 20.

When the recognition reliability of the leading vehicle 20 of the subject vehicle 1 is not secured, the controller 100 may control the speed regulator 70 so that the subject vehicle 1 drives toward the preceding vehicle 10 to decrease the first distance D1 between the subject vehicle 1 and the preceding vehicle 10 (1090). Therefore, the recognition rate of the leading vehicle 20 of the subject vehicle 1 may be increased.

In other words, as mentioned above, since the second distance D2 decreases in response to a decrease in the first distance D1 between the subject vehicle 1 and the preceding vehicle 10 and thus the subject vehicle 1, as illustrated in FIG. 5, when the first distance D1 decreases as the subject vehicle 1 approaches toward the preceding vehicle 10, the recognition reliability of the leading vehicle 20 of the subject vehicle 1 may increase.

On the other hand, when the subject vehicle 1 approaches toward the preceding vehicle 10, the controller 100 may control the subject vehicle 1 not to approach a minimum safety distance S or less so that the subject vehicle 1 does not collide with the preceding vehicle 10.

As illustrated in FIG. 5, when the first distance D1 decreases as the subject vehicle 1 approaches toward the preceding vehicle 10 under the control of the controller 100, the second distance D2 correspondingly decreases, thereby increasing the recognition reliability of the leading vehicle 20 of the subject vehicle 1.

Meanwhile, as illustrated in FIG. 6, the controller 100 may determine a relative speed V_rel and a relative distance X_rel of the vehicle 20 based on the position information and the speed information of the preceding vehicle 10 and the leading vehicle 20 obtained by the sensor 200. The controller 100 may also determine an acceleration of the preceding vehicle 10 based on the relative speed V_rel and the relative distance X_rel of the preceding vehicle 10 and the leading vehicle 20 (1050).

The controller 100 may compare the acceleration of the preceding vehicle 10 with a predetermined value (1060). At this time, the predetermined value is a minimum acceleration value for which the preceding vehicle 10 does not suddenly stop. When the acceleration of the preceding vehicle 10 is less than the predetermined value, the controller 100 may predict that the preceding vehicle 10 will suddenly stop.

When the second distance D2 between the preceding vehicle 10 and the leading vehicle 20 is less than or equal to the collision prediction distance FV_S of the preceding vehicle 10 and the leading vehicle 20 and the acceleration of the preceding vehicle 10 is less than the predetermined value, the controller 100 may control at least one of braking or steering of the subject vehicle 1 in order to avoid collision with the preceding vehicle 10 which is suddenly stopped.

The controller 100 may determine whether the subject vehicle 1 can avoid collision with the preceding vehicle 10 through braking based on the relative speed and the relative distance (first distance) of the subject vehicle 1 and the preceding vehicle 10.

In other words, when the first distance D1 between the subject vehicle 1 and the preceding vehicle 10 exceeds a braking possible distance of the subject vehicle 1 relative to the preceding vehicle 10 (1070), the controller 100 may control braking of the subject vehicle 1 to avoid collision with the preceding vehicle 10 (1080).

On the other hand, when the first distance D1 between the subject vehicle 1 and the preceding vehicle 10 is less than or equal to the braking possible distance of the subject vehicle 1 relative to the preceding vehicle 10, the controller 100 may determine whether a lane change is possible in the lane in which the subject vehicle 1 is currently driving (1140) based on obstacle information of a next lane detected by the sensor 200 (1130).

In other words, when a braking distance of the subject vehicle 1 with respect to the preceding vehicle 10 is not sufficiently secured, the collision with the preceding vehicle 10 should be avoided through steering avoidance, since the steering avoidance is impossible when there is the obstacle such as another vehicle driving in the next lane.

When it is possible to change the lane of the subject vehicle 1 as the result of the determination of the controller 100, the controller 100 may control the subject vehicle 1 to perform the steering avoidance with respect to the preceding vehicle 10 (1150).

On the other hand, when it is impossible to change the lane of the subject vehicle 1 as the result of the determination of the controller 100, the controller 100 may perform the braking control so that the subject vehicle 1 brakes with a maximum braking amount without controlling steering of the subject vehicle 1 (1160).

When the second distance D2 between the preceding vehicle 10 and the leading vehicle 20 is greater than the collision prediction distance FV_S, the controller 100 may compare the acceleration of the preceding vehicle 10 determined (1100) based on the position information and the speed information of the preceding vehicle 10 and the leading vehicle 20 obtained by the sensor 200 with the predetermined value (1110).

As the result of the comparison, when the acceleration of the preceding vehicle 10 is less than the predetermined value, the controller 100 may predict that the preceding vehicle 10 will suddenly stop.

In other words, when the second distance D2 between the preceding vehicle 10 and the leading vehicle 20 is greater than the collision prediction distance FV_S of the preceding vehicle 10 and the leading vehicle 20, and the acceleration of the preceding vehicle 10 is less than the predetermined value, the controller 100 may control the speed regulator 70 of the subject vehicle 1 so as to avoid the collision between the subject vehicle 1 and the preceding vehicle 10, thereby controlling the first distance D1 between the subject vehicle 1 and the preceding vehicle 20 to increase (1120).

In this case, the controller 100 may avoid the collision between the subject vehicle 1 and the preceding vehicle 10 by increasing an inter-vehicle distance between the subject vehicle 1 and the preceding vehicle 10.

On the other hand, when the acceleration of the preceding vehicle 10 exceeds the predetermined value, the controller 100 may predict that the preceding vehicle 10 will not suddenly stop. In this case, the controller 100 may control a current inter-vehicle distance between the subject vehicle 1 and the preceding vehicle 10 to be maintained.

According to the vehicle and the method of controlling the vehicle according to the exemplary embodiments, there is an effect of proactively coping with safety accidents by performing the inter-vehicle distance control to increase the reliability of the leading vehicle information and the braking control or the steering avoidance control of the preceding vehicle based on the leading vehicle information.

The disclosed exemplary embodiments may be implemented in the form of a recording medium storing instructions that are executable by a computer. The instructions may be stored in the form of a program code, and when executed by a processor, the instructions may generate a program module to perform operations of the disclosed exemplary embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
   a capturer configured to obtain height information of a preceding vehicle;
   a sensor configured to obtain at least one of position information or speed information of the preceding vehicle and a leading vehicle which is in front of the preceding vehicle; and
   a controller configured to:
      determine a first distance between the preceding vehicle and a subject vehicle that is behind the preceding vehicle;
      determine a second distance between the preceding vehicle and the leading vehicle, based on height information of the subject vehicle, the first distance, and the height information of the preceding vehicle;
      determine an acceleration of the preceding vehicle based on a relative speed and a relative distance of the preceding vehicle and the leading vehicle; and
      when the second distance is less than or equal to a collision prediction distance between the preceding vehicle and the leading vehicle and the acceleration of the preceding vehicle is less than a predetermined value, control at least one of braking or steering of the subject vehicle.

2. The vehicle according to claim 1, wherein the controller is configured to determine the collision prediction distance between the preceding vehicle and the leading vehicle based on a driving speed of the preceding vehicle and a time to collision (TTC) between the preceding vehicle and the leading vehicle.

3. The vehicle according to claim 1, further comprising a speed regulator configured to regulate a driving speed of the subject vehicle,
wherein, when the second distance is greater than the collision prediction distance between the preceding vehicle and the leading vehicle, the controller is configured such that the controller controls the speed regulator such that the subject vehicle drives toward the preceding vehicle to decrease the first distance, and
wherein the second distance decreases in response to a decrease in the first distance.

4. The vehicle according to claim 1, wherein, when the second distance is less than or equal to the collision prediction distance between the preceding vehicle and the leading vehicle and the acceleration of the preceding vehicle is less than the predetermined value, the controller is configured such that the controller controls the braking of the subject vehicle when the first distance is greater than a braking possible distance of the subject vehicle relative to the preceding vehicle.

5. The vehicle according to claim 1, wherein the sensor is further configured to obtain at least one of position information or speed information of an obstacle located in a lane next to a lane in which the subject vehicle is driving,
wherein the controller is configured such that the controller:
when the second distance is less than or equal to the collision prediction distance between the preceding vehicle and the leading vehicle and the acceleration of the preceding vehicle is less than the predetermined value, determines whether the subject vehicle is lane changeable based on an obstacle detection result of the sensor when the first distance is less than or equal to the braking possible distance of the subject vehicle relative to the preceding vehicle; and
when the subject vehicle is lane changeable, controls the steering of the subject vehicle with respect to the preceding vehicle.

6. The vehicle according to claim 5, wherein, when the second distance is less than or equal to the collision prediction distance between the preceding vehicle and the leading vehicle and the acceleration of the preceding vehicle is less than the predetermined value, the controller is configured such that the controller controls the braking of the subject vehicle with a maximum braking amount when the first distance is less than or equal to the braking possible distance of the subject vehicle relative to the preceding vehicle and the subject vehicle cannot change the lane according to the obstacle detection result of the sensor.

7. The vehicle according to claim 3, wherein, when the second distance is greater than the collision prediction distance between the preceding vehicle and the leading vehicle and the acceleration of the preceding vehicle is less than the predetermined value, the controller is configured such that the controller controls the speed regulator to control the driving speed of the subject vehicle to increase the first distance.

8. A method of controlling a vehicle comprising:
obtaining, by a capturer, height information of a preceding vehicle;
obtaining, by a sensor, at least one of position information or speed information of the preceding vehicle and a leading vehicle that is in front of the preceding vehicle;
determining, by a controller, a first distance between the preceding vehicle and a subject vehicle that is behind the preceding vehicle;
determining, by the controller, a second distance between the preceding vehicle and the leading vehicle, based on height information of a subject vehicle, the first distance, and the height information of the preceding vehicle;
determining, by the controller, an acceleration of the preceding vehicle based on a relative speed and a relative distance of the preceding vehicle and the leading vehicle; and
when the second distance is less than or equal to a collision prediction distance between the preceding vehicle and the leading vehicle and the acceleration of the preceding vehicle is less than a predetermined value, controlling, by the controller, at least one of braking or steering of the subject vehicle.

9. The method according to claim 8, wherein the collision prediction distance between the preceding vehicle and the leading vehicle is determined based on a driving speed of the preceding vehicle and a time to collision (TTC) between the preceding vehicle and the leading vehicle.

10. The method according to claim 8, further comprising regulating, by a speed regulator, a driving speed of the subject vehicle,
wherein the controlling at least one of braking or steering of the subject vehicle comprises:
when the second distance is greater than the collision prediction distance between the preceding vehicle and the leading vehicle, controlling the driving speed of the subject vehicle such that the subject vehicle drives toward the preceding vehicle to decrease the first distance; and
wherein the second distance decreases in response to a decrease in the first distance.

11. The method according to claim 8, wherein the controlling at least one of braking or steering of the subject vehicle comprises, when the second distance is less than or equal to the collision prediction distance between the preceding vehicle and the leading vehicle and the acceleration of the preceding vehicle is less than the predetermined value, controlling the braking of the subject vehicle when the first distance is greater than a braking possible distance of the subject vehicle relative to the preceding vehicle.

12. The method according to claim 8, further comprising obtaining, by the sensor, at least one of position information or speed information of an obstacle located in a lane next to a lane in which the subject vehicle is driving,
wherein the controlling at least one of braking or steering of the subject vehicle comprises:
when the second distance is less than or equal to the collision prediction distance between the preceding vehicle and the leading vehicle and the acceleration of the preceding vehicle is less than the predetermined value, determining whether the subject vehicle is lane changeable based on an obstacle detection result when the first distance is less than or equal to the braking possible distance of the subject vehicle relative to the preceding vehicle; and
when the subject vehicle is lane changeable, controlling the steering of the subject vehicle with respect to the preceding vehicle.

13. The method according to claim 12, wherein the controlling at least one of braking or steering of the subject vehicle comprises, when the second distance is less than or equal to the collision prediction distance between the preceding vehicle and the leading vehicle and the acceleration of the preceding vehicle is less than the predetermined value, controlling the braking of the subject vehicle with a maximum braking amount when the first distance is less than or equal to the braking possible distance of the subject vehicle relative to the preceding vehicle and the subject vehicle cannot change the lane according to the obstacle detection result.

14. The method according to claim 8, wherein the controlling at least one of braking or steering of the subject vehicle comprises, when the second distance is greater than the collision prediction distance between the preceding vehicle and the leading vehicle and the acceleration of the preceding vehicle is less than the predetermined value, controlling a driving speed of the subject vehicle to increase the first distance.

\* \* \* \* \*